United States Patent Office 3,335,202
Patented Aug. 8, 1967

3,335,202
COMPOSITION CONTAINING ELASTOMER POLYMERS AND/OR COPOLYMERS VULCANIZABLE BY MEANS OF PEROXIDES
Enzo di Giulio, Ferrara, and Bernardino Vecellio, Milan, Italy, assignors to Pirelli Società per Azioni and Montecatini Edison S.p.A., Milan, Italy, a corporation of Italy
No Drawing. Filed May 1, 1962, Ser. No. 191,433
Claims priority, application Italy, May 2, 1961, 8,310/61
12 Claims. (Cl. 260—889)

This invention relates to vulcanizable compositions comprising as their main component at least one elastomer polymer and/or copolymer vulcanizable by means of peroxides in the presence or absence of sulphur.

The invention concerns more particularly compositions, the main component of which comprises copolymers of ethylene with alpha olefins (such as ethylene-propylene or ethylene-butene-1 copolymers), or in which the said main component comprises rubber-like polymers and/or copolymers of butadiene and/or homologues thereof.

Italian Patent No. 607,975, issued Sept. 9, 1960, to the same assignee as in the present application discloses that copolymers of etthylene with alpha olefins, which are vulcanizable by means of peroxides, can be advantageously plasticized by means of co-vulcanizable polymers of low molecular weight, more particularly sodium polybutadiene, that is polybutadiene obtained by polymerizing butadiene in the presence of sodium metal.

Vulcanizable compositions of excellent plastic properties have thereby been obtained, the vulcanized products deriving therefrom exhibiting satisfactory mechanical properties. Moreover, by the addition of suitable soaps and metal oxides in accordance with Italian Patent No. 613,494, issued Sept. 6, 1960, to the same assignee as in the present application, such compositions exhibited a high and stable electrical insulation constant. This opened the possibility to very wide uses of the abovementioned compositions, such as in the field of tires for motor vehicle wheels, electric cables, hoses, pads and shock absorbers generally and a number of other uses. However, in practice, it was ascertained that the extrudability of the abovementioned compositions was not wholly satisfactory, so that their use in the field of extruded articles was in fact limited to cross-sectional profiles of a simple shape, deprived of sharp or acute angles or tapered parts.

An object of this invention is to provide vulcanizable elastomer polymer and/or copolymer containing compositions, vulcanizable by means of peroxides, which are of a high extrudability index.

In this connection a standard for extrudability is adopted in the specific case in accordance with the so-called "Garvey extrudability index" (B. S. Garvey, Jr., M. N. Whitlook, J. A. Freese, Jr., Industrial and Engineering Chemistry, vol. 34, p. 1309 (1942), which is ascertained by extruding the composition by means of a Royle extruder provided with a die of a special shape; the extrudability index is the result of the sum of four numerals (each being variable between 1 and 4), relating to the resemblance of the cross section of the extruded article to the cross section of the die, fringing of the edges, aspect of the surfaces and aspect of edges. The sum of the said numerals is therefore variable up to 16 and is all the higher the better the behaviour of the composition on extruding.

A further object of this invention is to obtain the desired improvement of the extrudability at the same time as a satisfactory reduction in Mooney viscosity with respect to the viscosity of the composition without the plasticizer. It is known that Mooney viscosity defines the attitude to mechanical working of the composition before vulcanization, such as on a calender or extruder.

A further object is to obtain the abovementioned improvement in viscosity and extrudability without adversely affecting the mechanical properties of the vulcanized material, more particularly the modulus of elasticity. For it is known that when using conventional plasticizers a decrease in viscosity mostly results in a lowering of the mechanical properties of the vulcanized article.

A further object of this invention is to provide an advantageous plasticizer adapted to fulfil the purposes mentioned above.

According to this invention the said purposes are fulfilled by elastomer polymer and/or copolymer containing compositions vulcanizable by means of peroxides, possibly in the presence of sulfur, comprising in a thoroughly mixed state at least one diene polymer or copolymer of low molecular weight prepared by means of a lithium catalyst, of an intrinsic viscosity (measured in toluene at 30° C. and expressed in 100 ml./g.) ranging between 0.1 and 1.

The diene polymer or copolymer of low molecular weight according to this invention is selected from the group consisting of polybutadiene, polyisoprene or a copolymer of butadiene or isoprene with an alpha olefin, such as styrene; broadly, the proportion of the latter in the copolymer should not exceed about 30 mols percent. Most advantageous results are obtained when the intrinsic viscosity of the said polymer or copolymer of low molecular weight, determined as above, ranges between 0.2 and 0.7.

The expression "lithium catalyst" as used in this specification should be understood to include organometallic lithium compounds, more particularly lithium alkyls (such as butyllithium), as well as dispersions of lithium metal in hydrocarbon mixtures, such as Vaseline. Polymerization of the diolefin (such as butadiene) or its copolymerization with alpha olefin (such as styrene) in the presence of a lithium catalyst should be carried out in the bulk of the material or in a solution in an anhydrous inert preferably low-boiling organic solvent, such as pentane, hexane, heptane or mixtures thereof. The viscosity (which is related to the average molecular weight) of the resulting polymer or copolymer mainly depends upon the proportion of catalyst; it is moreover affected by further factors, such as purity of components, polymerizing temperature, etc. Polymerization can be carried out, if desired, in the presence of ethereous products, such as tetrahydrofuran, as is known to the experts (compare I. Kunts and A. Gerber: The Butyllithium-Initiated Polymerization of 1.3-Butadiene—J. Polymer Sci. 42, 299–308 (1960)).

It should be noted that diene polymers and copolymers of low molecular weight as referred to above, employed for the purposes of this invention, are not sticky, but are flowable, such as of the consistency of honey.

EXAMPLE 1

10 mixes of the following composition were prepared under identical conditions:

|  | Parts by weight |
|---|---|
| Ethylene-propylene copolymer containing 50 mols percent ethylene, Mooney viscosity 50 ML 1+4 (100° C.) | 100 |
| Plasticizer (according to Table 1) | 15 |
| HAF black | 50 |
| Zinc oxide | 5 |
| 40% cumyl peroxide (diluted with calcium carbonate) | 5 |
| Sulphur | 0.24 |

The ten mixes differed merely by the plasticizer employed. Discs were made from said mixes, which were vulcanized under pressure during 80 minutes at 151° C. and from which Schopper rings were cut for conventional tensile strength tests.

The nature of the plasticizers as well as results obtained through their use in the above indicated mixes are set out in Table 1 hereafter.

In this table the Mooney viscosity is reported which, as is well known, is determined in accordance with the ASTM D927–57T standard and is distinguished by the notation ML 1+4 (100° C.), and the modulus of elasticity is further given, which is the specific load on the vulcanized article on 300% elongation (it is expressed hereafter by kg./cm.$^2$).

Percentage variations relate to corresponding results obtained from a mix of the same composition, from which the plasticizer was omitted. The Garvey index of the latter is 6.

tail any reduction in the modulus of elasticity of the vulcanized article. The plasticizing action of lithium polybutadiene (1) compares with the action of sodium polybutadiene (3) and leads more or less to a similar reduction in the modulus of elasticity of the vulcanized article; however, Garvey's index obtained from polybutadiene (1) is far superior over the index from sodium polybutadiene (3) which does not lead to any improvement either in respect of the mix without a plasticizer. A similar remark applies in respect of plasticizer (9), lithium butadiene-styrene copolymer also.

EXAMPLE 2

Further tests were carried out on mixes of the same composition as given in Example 1 with other plasticizers (reported in Table 2) in a proportion of ten parts to 100 parts ethylene-propylene copolymer. Table 2 reports the results which further clear the specific plasticizing properties of lithium polymers according to this invention.

TABLE 1

| Plasticizer (nature) | Viscosity at 60% C. (poise) | Intrinsic viscosity at 30° C. | Variation in Mooney viscosity of the mix (percent) | Garvey's index | Variation in modulus of elasticity of the vulcanized article (percent) |
| --- | --- | --- | --- | --- | --- |
| Lithium polybutadiene (1) | 435 | 0.46 | −41 | 13 | −22 |
| Lithium polybutadiene (2) | 1,115 | 0.44 | −44 | 13 | 0 |
| Sodium polybutadiene (3) | 230 | | −45 | 6 | −21 |
| Lithium polyisoprene (4) | 400 | 0.37 | −37 | 13 | −35 |
| Lithium polyisoprene (5) | 2,000 | 0.27 | −51 | 12 | −34 |
| Polychloroprene (6) | 10,000 | | −4.5 | 4.5 | −66 |
| Polyisobutylene (7) | 16 | | −30 | 9.5 | −47 |
| Polyisobutylene (8) | >10,000 | | −27 | 10.5 | −34 |
| Lithium butadiene-styrene copolymer (9) | 363 | 0.38 | −45 | 12 | −27 |
| Acrylonitrilebutadiene copolymer (10) | 85 | | −34 | 4.5 | −60 |

The plasticizer (1) was obtained in a heptane solution (monomer/solvent ratio by weight 1:2) with about 0.5% lithium-butyl to the butadiene weight at 30° C. The monomer was nearly totally converted (about 95%). The plasticizer (2) was obtained under the same conditions as plasticizer (1) but for the addition of an ethereous product (tetrahydrofuran) to the polymerizing system.

Plasticizer (3) consisted of Plastikator 32, Buna Werke Sohkopau. The plasticizer (4) was obtained like (1) but with a monomer/solvent ratio of 1:3 by weight. Plasticizer (5) was obtained like (4) but for the addition of tetrahydrofuran to the polymerizing system.

Plasticizers (6), (7) and (8) consisted of Neoprene FB, Du Pont, Polybutene Oronite and Oppanol B6, Bayer, respectively.

Plasticizer (9) was obtained like (1) with an initial butadiene/styrene ratio of 80:20 by weight; combined styrene about 17%.

Plasticizer (10) consisted of Hycar 1312, Goodrich (33% acrylonitrile).

Table 1 discloses that lithium diene polymers and copolymers of low molecular weight according to this invention are far superior over known plasticizers in respect of Garvey's extrudability index. At the same time, variations in Mooney viscosity denote an undoubtedly excellent plasticizing action. A particular attention is deserved by lithium polybutadiene (2), which does not en-

TABLE 2

| Plasticizer (nature) | Viscosity at 60° C. (poise) | Variation in Mooney viscosity of the mix (percent) | Variation in the modulus of elasticity of the vulcanized article (percent) |
| --- | --- | --- | --- |
| Lithium polybutadiene (11) | 530 | −27 | −20 |
| Polybutadiene (12) | 229 | −14 | −54 |
| Butadiene-styrene copolymer (13) | 71 | −14 | −59 |
| Mineral oil (14) | | −17 | −36 |
| Hydrogenated colophony (15) | | −18 | −30 |
| Hydrogenated colophony esterified with pentaerythrite (16) | | −16 | −59 |
| Plasticizer for butyl rubber (17) | | −21 | −59 |

Plasticizer (11) consisted of polybutadiene obtained by the method reported in connection with lithium polybutadiene (1) of the preceding example.

Plasticizer (12) was obtained by radicalic polymerization in an aqueous emulsion at elevated temperature (50° C.), potassium persulphate being employed as an initiator and lauryl mercaptan by a large dose being employed as modifier.

Plasticizer (13) was obtained under the same conditions as polybutadiene (12) with an initial butadiene-styrene ratio of 75:25 by weight.

Plasticizers (14), (15), (16), (17), consisted of Circosol 2XH, Sun Oil Co., Staybelite Resin, Hercules Powder Co., Pentalyn H, Hercules Powder Co., Butyl Struktol, Schill & Seilacher Chem. Fabrik.

The Garvey extrudability index of the mix containing lithium polybutadiene (11) is satisfactory, equalling (14), while the index of mixes prepared with the other plasticizers is very low.

Table 2 shows that polymers (12) and (13), obtained by polymerization in an emulsion of butadiene alone and with styrene, plasticize less than lithium polybutadiene (11) and lead to a definite further sinking of the modulus of elasticity. The same applies to non-polymer plasticizers (14), (15), (16), (17), which are widely different in nature and physical properties, and are often employed in mix compositions with various synthetic rubbers.

EXAMPLE 3

Five mixes were prepared on a roller mixer, containing an ethylene propylene copolymer with 50 mols percent ethylene, of Mooney viscosity 52 ML 1+4 (100° C.), the detailed composition of which and results are reported in Table 3 hereafter.

TABLE 3

| Components | Mixes | | | | |
|---|---|---|---|---|---|
| | 1 | 2 | 3 | 4 | 5 |
| Ethylene-propylene copolymer (parts by weight) | 100 | 100 | 100 | 100 | 100 |
| HAF black | 50 | 50 | 50 | 50 | 50 |
| Zinc oxide | 5 | 5 | 5 | 5 | 5 |
| Lithium polybutadiene viscosity, 530 poise at 60° C., intrinsic viscosity 0.48 at 30° C | | 5 | 10 | 15 | 20 |
| 40% Cumyl peroxide | 5 | 5 | 5 | 5 | 5 |
| Sulphur | 0.24 | 0.24 | 0.24 | 0.24 | 0.24 |
| Garvey index | 6.5 | 11 | 13 | 14 | 14 |
| Mooney viscosity ML 1+4 (100° C.) | 97 | 87 | 71 | 41 | 32 |
| Load on 300% elongation (kg./cm.²) | 107 | 100 | 85 | 80 | 69 |
| Tensile strength | 208 | 182 | 182 | 159 | 155 |
| Elongation at break (percent) | 460 | 445 | 470 | 440 | 470 |

In the course of further tests lithium polybutadiene samples were prepared of different viscosity, and their plasticizing effect was examined.

It was ascertained that an excellent effect was given by polybutadienes of an intrinsic viscosity ranging between 0.4 and 0.6 approximately.

Garvey's index is not appreciably displaced on variation within relatively wide limits of viscosity of lithium polybutadiene, as reported by Table 4 hereafter, relating to mixes of the same composition of mix 4 in Table 3.

TABLE 4

| Viscosity (poise) at 60° C. | Intrinsic viscosity | Garvey's index |
|---|---|---|
| 342 | 0.42 | 12.5 |
| 400 | 0.44 | 14 |
| 530 | 0.48 | 14 |
| 620 | 0.50 | 14 |
| 1,200 | 0.53 | 14 |
| 1,900 | 0.58 | 13 |

EXAMPLE 4

Further tests were carried out with mixes containing SBR 1500 (highly unsaturated butadiene-styrene copolymer with about 23% styrene, obtained in an emulsion at 5° C.), cumyl peroxide diluted to 40% with calcium carbonate being employed as a vulcanizing agent.

Such mixes of the compositions given in Table 5 hereafter yield the results reported in the same table.

TABLE 5

| Components | Mixes | | | |
|---|---|---|---|---|
| | 1 | 2 | 3 | 4 |
| SBR 1500 | 100 | 100 | 100 | 100 |
| Li Polybutadiene (320 poise at 60° C.) | | 10 | | |
| Na Polybutadiene (Plastikator 32) | | | 10 | |
| Mineral Oil (Dutrex R Shell) | | | | 10 |
| HAF Black | 50 | 50 | 50 | 50 |
| Zinc oxide | 5 | 5 | 5 | 5 |
| 40% Cumyl peroxide in calcium carbonate | 5 | 5 | 5 | 5 |
| Sulphur | 0.24 | 0.24 | 0.24 | 0.24 |
| Mooney viscosity ML 1+4 (100° C.) | 78 | 54 | 55 | 56 |
| Garvey's index | 14.5 | 15.5 | 16 | 15 |
| After 80 minutes vulcanization at 151° C.: | | | | |
| Load on 300% elongation (kg./cm²) | 180 | 140 | 133 | 105 |
| Tensile strength (kg./cm.²) | 223 | 200 | 207 | 190 |
| Elongation at break (percent) | 340 | 380 | 410 | 460 |

It will be seen that the plasticizing action on the crude mix expressed by the value of Mooney's viscosity and the effect on the extrudability of the crude mix indicated by Garvey's index are approximately the same with the three plasticizers.

Lowering of the modulus of elasticity of the vulcanized article is obviously worse in the case of mineral oil. The two polymer plasticizers are approximately equivalent: a slight advantage results with lithium polybutadiene. Tensile strength is hardly affected.

Substantially similar results were obtained by employing fluid lithium polymers as plasticizers for mixes containing other diene rubbers, such as polymers and copolymers of butadiene and homologues thereof, vulcanized by means of peroxides with or without addition of sulphur.

Broadly, the proportion by weight of low plasticizing polymers or copolymers according to this invention does not exceed 20% to the weight of the base elastomer. However, this does not exclude the possibility of employing even larger proportions, especially when any reduction in the modulus of elasticity of the vulcanized article is not of material practical importance or when extrusion requirements prevail over elasticity, as is often the case with the manufacture of structural members for doors, windows and the like.

It will be understood that the invention is not limited to the embodiments only described in the above examples, and the teachings contained herein open the possibility towards a large number of further embodiments falling within the spirit and included within the scope of the appended claims.

What we claim is:

1. A vulcanizable composition comprising essentially:
   (a) as a main component at least one elastomer vulcanizable by means of peroxides, said elastomer selected from the class consisting of (i) copolymers of ethylene with propylene and (ii) copolymers of ethylene with butene-1,
   (b) as a plasticizer, a non-elastomeric, low molecular weight polymeric diene compound of an intrinsic viscosity value from 0.1 to 1 prepared in the presence of a lithium catalyst selected from the class consisting of organolithium compounds and lithium metals, said compound being selected from the class consisting of (i) polybutadiene, (ii) polyisoprene, (iii) copolymers of butadiene with styrene, and (iv) copolymers of isoprene with styrene, and being present in an amount not exceeding 20% by weight based on the elastomeric main component.

2. A vulcanizable composition according to claim 1, wherein the main component is an elastomeric copolymer of ethylene with propylene and the non-elastomeric plasticizer is polybutadiene.

3. A vulcanizable composition according to claim 1 wherein the main component is an elastomeric copolymer of ethylene with butene-1 and the non-elastomeric plasti-plasticizer is polyisoprene.

4. A vulcanizable composition according to claim 1 wherein the main component is an elastomeric copolymer of ethylene with butene-1 and the non-elastomeric plasticizer is polybutadiene.

5. A vulcanizable composition according to claim 1 wherein the main component is an elastomeric copolymer of ethylene with propylene and the non-elastomeric plasticizer is a copolymer of isoprene with styrene.

6. A vulcanizable composition comprising essentially as a main component an elastomeric copolymer of ethylene with propylene vulcanizable by means of peroxides and a non-elastomeric polybutadiene plasticizer of low molecular weight having an intrinsic viscosity value from 0.4 to 0.6, said plasticizer prepared in the presence of an organolithium catalyst and being present in an amount not exceeding 20% by weight based on the weight of the copolymer of ethylene with propylene.

7. A vulcanizable composition comprising essentially as a main component at least one elastomer vulcanizable by means of peroxides, said elastomer selected from the class consisting of copolymers of ethylene with propylene and copolymers of ethylene with butene-1 and, as a minor component, a non-elastomeric polybutadiene plasticizer of low molecular weight having an intrinsic viscosity value of 0.4 to 0.6, said plasticizer being prepared in the presence of an organolithium catalyst and being present in an amount not exceeding 20% by weight based on the said main component.

8. A vulcanizable composition comprising essentially as a main component an elastomeric copolymer of ethylene with butene-1, vulcanizable by means of peroxides and as the minor component a non-elastomeric polybutadiene plasticizer of low molecular weight having an intrinsic viscosity value from 0.4 to 0.6, prepared in the presence of a lithium metal catalyst, said plasticizer being present in an amount not exceeding 20% by weight based on said copolymer of ethylene with butene-1.

9. A vulcanizable composition according to claim 1 wherein the main component is an elastomeric copolymer of ethylene with butene-1 and the non-elastomeric plasticizer is polyisoprene.

10. A vulcanizable composition according to claim 1 wherein the main component is an elastomeric copolymer of ethylene with butene-1 and the non-elastomeric plasticizer is a copolymer of butadiene with styrene.

11. A vulcanizable composition according to claim 1 wherein the main component is an elastomeric copolymer of ethylene with butene-1 and the non-elastomeric plasticizer is a copolymer of isoprene with styrene.

12. A vulcanizable composition according to claim 1 wherein the intrinsic viscosity of the plasticizer is between about 0.2 and about 0.7.

References Cited

UNITED STATES PATENTS

| | | | |
|---|---|---|---|
| 2,638,460 | 5/1953 | Crouch | 260—33.6 |
| 2,832,748 | 4/1958 | Safford et al. | 260—45.5 |

FOREIGN PATENTS

| | | |
|---|---|---|
| 217,159 | 9/1958 | Australia. |
| 817,693 | 8/1959 | Great Britain. |
| 607,976 | 9/1960 | Italy. |

OTHER REFERENCES

Binder: Microstructures of Polybutadienes and Butadiene-Styrene Copolymer, vol. 46, No. 8, pp. 1727 to 1730, August 1954, Industrial and Engineering Chemistry (copy in Group 140).

JOSEPH L. SCHOFER, *Primary Examiner.*

F. L. DENSON, *Assistant Examiner.*

UNITED STATES PATENT OFFICE
CERTIFICATE OF CORRECTION

Patent No. 3,335,202                        August 8, 1967

Enzo di Giulio et al.

It is hereby certified that error appears in the above numbered patent requiring correction and that the said Letters Patent should read as corrected below.

Column 7, line 1, for "butene-1" read -- propylene --.

Signed and sealed this 6th day of August 1968.

(SEAL)
Attest:

Edward M. Fletcher, Jr.
Attesting Officer

EDWARD J. BRENNER
Commissioner of Patents